United States Patent
Stone et al.

(10) Patent No.: US 11,077,627 B2
(45) Date of Patent: Aug. 3, 2021

(54) MULTI-FUNCTIONAL PROTECTIVE ASSEMBLIES, SYSTEMS INCLUDING PROTECTIVE ASSEMBLIES, AND RELATED METHODS

(71) Applicant: Northrop Grumman Systems Corporation, Falls Church, VA (US)

(72) Inventors: Steven F. Stone, Irvine, CA (US); Matt Armentrout, Salt Lake City, UT (US); Christopher Deemer, Sandy, UT (US); Carl Madsen, Park City, UT (US); Brian Barber, Wilmington, OH (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 312 days.

(21) Appl. No.: 16/103,428

(22) Filed: Aug. 14, 2018

(65) Prior Publication Data

US 2019/0047234 A1    Feb. 14, 2019

Related U.S. Application Data

(60) Provisional application No. 62/545,340, filed on Aug. 14, 2017.

(51) Int. Cl.
*B29C 65/00* (2006.01)
*B64G 1/22* (2006.01)
(Continued)

(52) U.S. Cl.
CPC ........ *B29C 66/73754* (2013.01); *B29C 66/71* (2013.01); *B29C 66/721* (2013.01);
(Continued)

(58) Field of Classification Search
CPC ........ E04C 2/296; E04C 2/2885; E04C 2/288; B29L 2031/3076; G21F 1/08;
(Continued)

(56) References Cited

U.S. PATENT DOCUMENTS

| | | |
|---|---|---|
| 4,428,998 A | 1/1984 | Hawkinson |
| 5,196,228 A | 3/1993 | Kirby et al. |

(Continued)

FOREIGN PATENT DOCUMENTS

| | | | |
|---|---|---|---|
| EP | 2517960 A2 | 10/2012 | |
| FR | 2713327 A1 * | 6/1995 | ........... F41H 5/0442 |

OTHER PUBLICATIONS

DuPont™ Vamac® Fluid Resistance, Technical Information—Rev. 2, Aug. 2010, 8 pages.

(Continued)

*Primary Examiner* — Camie S Thompson
(74) *Attorney, Agent, or Firm* — TraskBritt (57) ABSTRACT

A protective assembly comprises a first region formulated and configured to provide protection from alpha, beta, and electromagnetic radiation and comprising a composite of particles and polymer; a second region formulated and configured to provide protection from ballistic impact and comprising a composite of fibers and polymer; and a third region formulated and configured to provide protection from thermal radiation and comprising a composite of particles, fiber, and polymer. The protective assembly may be provided on an aerospace structure. The protective assembly may be formed on the aerospace structure body using a co-curing process.

22 Claims, 5 Drawing Sheets

(51) Int. Cl.
- *B64G 1/54* (2006.01)
- *B64G 1/56* (2006.01)
- *B64G 1/58* (2006.01)
- *F41H 5/04* (2006.01)
- *B64D 7/00* (2006.01)
- *B29L 31/30* (2006.01)
- *B32B 15/02* (2006.01)
- *B32B 37/10* (2006.01)
- *B32B 37/00* (2006.01)
- *G21F 1/10* (2006.01)

(52) U.S. Cl.
CPC ...... *B29C 66/727* (2013.01); *B29C 66/72321* (2013.01); *B29C 66/7314* (2013.01); *B29C 66/7315* (2013.01); *B29C 66/7392* (2013.01); *B64D 7/00* (2013.01); *B64G 1/226* (2013.01); *B64G 1/54* (2013.01); *B64G 1/56* (2013.01); *B64G 1/58* (2013.01); *F41H 5/0435* (2013.01); *F41H 5/0464* (2013.01); *F41H 5/0471* (2013.01); *F41H 5/0492* (2013.01); *B29L 2031/3076* (2013.01); *B32B 15/02* (2013.01); *B32B 37/10* (2013.01); *B32B 2037/0092* (2013.01); *B32B 2274/00* (2013.01); *B32B 2305/022* (2013.01); *B32B 2305/08* (2013.01); *B32B 2305/38* (2013.01); *B32B 2305/74* (2013.01); *B32B 2307/212* (2013.01); *B32B 2307/306* (2013.01); *B32B 2307/558* (2013.01); *B32B 2309/12* (2013.01); *B32B 2309/68* (2013.01); *B32B 2323/16* (2013.01); *B32B 2327/18* (2013.01); *B32B 2398/20* (2013.01); *B32B 2605/18* (2013.01); *G21F 1/106* (2013.01)

(58) Field of Classification Search
CPC .. G21F 1/106; B64G 1/54; B64G 1/56; B64G 1/58; B64G 1/226; Y10S 220/90; Y10S 428/911; B64D 7/00; B29C 66/73754; B29C 66/721; B29C 66/72321; B29C 66/727; B29C 66/7314; B29C 66/7315; B29C 66/7392; B29C 66/71; F41H 5/0471; F41H 5/0435; F41H 5/0492; F41H 5/0464; B32B 2398/20; B32B 2323/16; B32B 2605/18; B32B 15/02; B32B 2037/0092; B32B 2307/212; B32B 2307/306; B32B 2307/558; B32B 37/10; B32B 2274/00; B32B 2305/08; B32B 2305/74; B32B 2305/022; B32B 2327/18; B32B 2309/12; B32B 2309/68

USPC ................ 2/2.5; 52/741.3; 250/515.1, 503.1, 250/518.1; 428/327, 911, 209, 312.8, 428/313.5, 34.6, 36.1, 411.1, 446; 89/36.01; 164/97; 442/1, 121, 248, 254, 442/263, 267, 58; 220/900; 244/121, 244/171.7; 273/408; 427/407.1
See application file for complete search history.

(56) References Cited

U.S. PATENT DOCUMENTS

| | | |
|---|---|---|
| 5,413,023 A | 5/1995 | Babel et al. |
| 5,425,973 A | 6/1995 | Frangipane et al. |
| 6,743,504 B1 | 6/2004 | Allen et al. |
| 7,556,854 B2 | 7/2009 | Farkas et al. |
| 7,854,967 B2 | 12/2010 | Keener et al. |
| 8,460,777 B2 | 6/2013 | Long |
| 9,255,197 B2 | 2/2016 | Leufgens et al. |
| 9,640,288 B1 | 5/2017 | Wong |
| 9,685,710 B1 | 6/2017 | Hijmans et al. |
| 2005/0211930 A1 | 9/2005 | DeMeo et al. |
| 2006/0160932 A1 | 7/2006 | Taylor et al. |
| 2007/0110977 A1 | 5/2007 | Al-Haik et al. |
| 2007/0194256 A1 | 8/2007 | Srobel et al. |
| 2011/0014356 A1 | 1/2011 | Fornes et al. |
| 2012/0175467 A1 | 7/2012 | Dye et al. |
| 2012/0273622 A1 | 11/2012 | Long |
| 2013/0149934 A1 | 6/2013 | Sang et al. |
| 2013/0161564 A1 | 6/2013 | Churhill et al. |
| 2013/0287984 A1 | 10/2013 | Kemp |
| 2013/0340601 A1 | 12/2013 | Townsend et al. |
| 2014/0144568 A1 | 5/2014 | MacAdams et al. |
| 2015/0044488 A1 | 2/2015 | Nesbitt |
| 2015/0048209 A1 | 2/2015 | Hoyt et al. |
| 2015/0056433 A1 | 2/2015 | MacAdams et al. |
| 2016/0362565 A1 | 12/2016 | Fornes et al. |
| 2017/0080685 A1 | 3/2017 | Palmieri et al. |
| 2019/0120174 A1 | 4/2019 | Gajiwala et al. |

OTHER PUBLICATIONS

DuPont™ Vamac® Compounding Processing Guide—Vamac® Dipolymers, Technical Information, Rev. 3, Jul. 2010, 6 pages.
Written Opinion of the International Searching Authority received for PCT Patent Application No. PCT/US2018/046692, dated Nov. 7, 2018, 10 pages.
International Search Report received for PCT Patent Application No. PCT/US2018/046692, dated Nov. 7, 2018, 06 pages.
European Communication pursuant to Article 94(3) EPC for European Application No. 18765247.4, dated Apr. 21, 2021, 6 pages.

* cited by examiner

MULTI-FUNCTIONAL PROTECTIVE ASSEMBLIES, SYSTEMS INCLUDING PROTECTIVE ASSEMBLIES, AND RELATED METHODS

CROSS-REFERENCE TO RELATED APPLICATION

This application claims the benefit under 35 U.S.C. § 119(e) of U.S. Provisional Patent Application Ser. No. 62/545,340, filed Aug. 14, 2017, the disclosure of which is hereby incorporated herein in its entirety by this reference.

TECHNICAL FIELD

The disclosure, in various embodiments, relates generally to assemblies for shielding (e.g., protecting) an underlying structure, such as, for example, an aircraft or a spacecraft (e.g., aerospace structure), to systems including protective assemblies, and to methods of forming protective assemblies and systems.

BACKGROUND

Aerospace vehicles, such as aircraft and spacecraft, may have an external protection system to endure launch, in-flight, and space environments. These environments may subject the aerospace vehicle to impact with foreign objects, such as rain, birds, rocks, dirt, micro-meteoroids, and other orbital debris, that may damage the vehicle. In addition, these foreign objects may approach the aerospace vehicle at subsonic velocities, such about 0.3 km/second, and at hypersonic velocities, such as at least 3 km/second. Furthermore, the aerospace vehicle may also be subject to aerodynamic heat from atmospheric friction generated during launch and flight. The aerospace vehicle may also be subject to heating created by thermal flash, solar and nuclear burst induced radiation, so-called Advanced Threat radiation as may be produced by directed-energy weapons, and the like encountered by the vehicle during flight. Additionally, the aerospace vehicle may also be subject to damage by electromagnetic phenomena, such as electromagnetic pulses and lightning strikes.

Adhesive bonding has been previously used to join protection systems to the aerospace vehicle. Such adhesives are provided at an interface between the protection system and the structural body of the aerospace vehicle. Using adhesives that are discrete from either the protection system or the structural body of the aerospace vehicle provides a distinct bond line between the protective system and vehicle skin. Furthermore, adhesives provide a mechanical bond between the protection system and the exterior of the aerospace vehicle rather than a direct chemical bond between the protection system and the exterior of the aerospace vehicle. Consequently, adhesives are a relatively weak bonding method. Accordingly, during operation of the vehicle, the protection system may at least partially break away from the aerospace vehicle and leave a portion of the vehicle exterior exposed to the harmful operating environments previously described. Such adhesives also add weight to the aerospace vehicle, introduce additional mechanical impedance, thermal conductance, and shock propagation, have limited thermal properties, and are difficult to repair in the event of damage. Using adhesive bonding to join layers of the protective system has similar disadvantages to adhesives provided at the interface between the protection system and the structural body of the aerospace vehicle. For example, such adhesive bonding adds weight to the aerospace vehicle, forms a weak mechanical rather than chemical bond, and renders the distinct bond lines susceptible to failure by thermal and mechanical stresses.

BRIEF SUMMARY

In some embodiments, the disclosure includes a protective assembly comprising a first region formulated and configured to provide protection from alpha, beta, and electromagnetic radiation and comprising a composite of particles and polymer; a second region formulated and configured to provide protection from ballistic impact and comprising a composite of fibers and polymer; and a third region formulated and configured to provide protection from thermal radiation and comprising a composite of particles, fibers, and polymer. Each of the first region, the second region, and the third region comprises a common polymer.

In some embodiments, the disclosure includes an aerospace structure comprising an aerospace structure body and a protective assembly formed on an exterior surface of the aerospace structure body. The protective assembly comprises a first region formulated and configured to provide protection from alpha, beta, and electromagnetic radiation and comprising a composite of particles and polymer; a second region formulated and configured to provide protection from ballistic impact and comprising a composite of fibers and polymer; and a third region formulated and configured to provide protection from thermal radiation and comprising a composite of particles, fibers, and polymer. Each of the first region, the second region, and the third region comprises a common polymer.

In some embodiments, the disclosure includes a method of forming a protective assembly for an aerospace vehicle comprising mounting a protective assembly over an aerospace structure body. The protective assembly comprises a first region formulated and configured to provide protection from alpha, beta, and electromagnetic radiation and comprising a composite of particles and polymer; a second region formulated and configured to provide protection from ballistic impact and comprising a composite of fibers and polymer; and a third region formulated and configured to provide protection from thermal radiation and comprising a composite of particles, fibers, and polymer. Each of the first region, the second region, and the third region is provided in an at least partially uncured state. The method further comprises co-curing the protective assembly to form a chemical bond between adjacent regions of the first region, the second region, and the third region and to attach the protective assembly to the aerospace structure body.

BRIEF DESCRIPTION OF THE DRAWINGS

While the specification concludes with claims particularly pointing out and distinctly claiming what are regarded as embodiments of the disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not actual views of any particular structure, device, assembly, protective structure (e.g., shield), or aerospace vehicle, but are merely idealized representations employed to describe example embodiments of the disclosure. The following description provides specific details of embodiments of the disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, any drawings accompanying the application are for illustrative purposes only, and are thus not drawn to scale. Additionally, elements common between figures may have corresponding numerical designations.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

Composites or composite materials as discussed herein may include one or more plies of material or ply layers included a reinforcing material (e.g., reinforcing fibers) in at least some matrix material, which plies may be laid up on a tool one at a time and/or multiple layers at the same time. The plies or layers can be made of any materials with fibers (or plies) that exhibit desired characteristics including, but not limited to, pre-preg material and/or dry fiber material. The pre-preg material and the dry fiber material can include, but are not limited to, unidirectional tapes, bias tapes, woven fabrics, non-woven fabrics, and non-crimp fabrics. The orientation of the fibers (or plies) may also vary throughout the structure.

According to embodiments of the disclosure, a protective assembly 100 may include a plurality of regions (e.g., two or more regions) that address multi-functional aspects for protecting an aerospace structure 110. In some embodiments, the aerospace structure 110 may comprise a body of a vehicle configured for flight such as an aircraft or a spacecraft. As used herein, the term "spacecraft" may mean and include vehicles or devices designed for travel or operation outside the Earth's atmosphere. As used herein, the term "aircraft" may mean and include vehicles or devices designed for travel or operation inside the earth's atmosphere. Structure 110 according to embodiments of the disclosure may include a satellite, a missile, including a Ground Based Strategic Deterrent (GBSD), a Ground Based Midcourse Defense (GMD) system, an Exoatmospheric Kill Vehicle (EKV), and other movable or stationary structures. As used herein, the term "aerospace structure" is used to collectively refer to aircraft, spacecraft, satellite, missiles, or other movable or stationary structures for use in Earth's atmosphere and/or surrounding space outside Earth's atmosphere.

The protective assembly 100 may be provided on the aerospace structure 110 to protect the aerospace structure 110 against one or more threats that may be encountered by the aerospace structure 110 (e.g., during use) inside and/or outside the Earth's atmosphere. For example, the aerospace structure 110 may be subject to harmful radiation, thermal flash, lightning strikes (e.g., electrostatic pulses), ballistic impact, aerothermal heating, electromagnetic pulses, and/or other harmful environment impacts.

Figure 1:
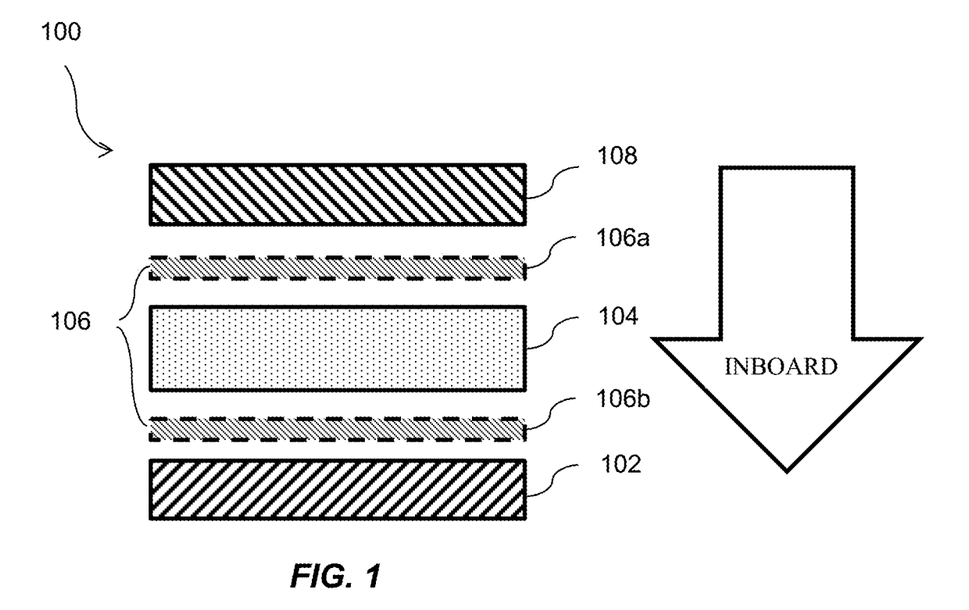
FIG. 1 is a schematic cross-sectional view of a protective assembly according to embodiments of the disclosure.
Figure 2:
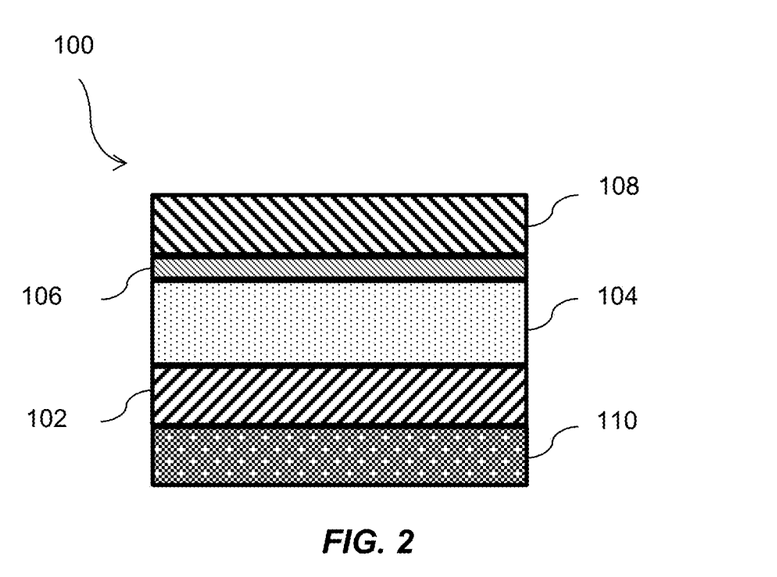
FIG. 2 is a schematic cross-sectional view of a protective assembly disposed on an aerospace structure according to some embodiments of the disclosure.
Figure 6:
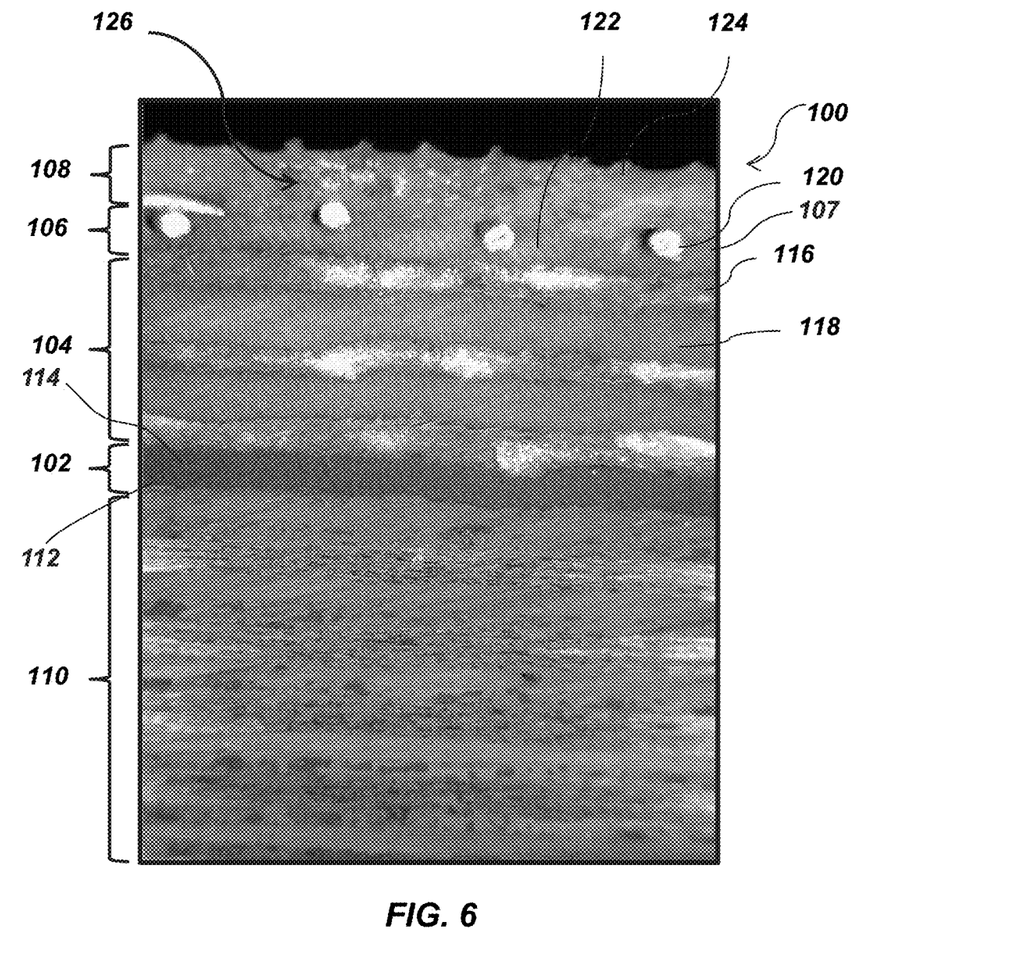
FIG. 6 is a cross-sectional micrograph of a protective assembly co-cured on an aerospace structure according to embodiments of the disclosure.

The composition of the protective assembly 100 may be selected to provide protection against one or more anticipated threats. According to embodiments of the disclosure and as illustrated in FIGS. 1, 2, and 6, the protective assembly 100 may include a radiation protection region 102, a ballistic protection region 104, an electrical charge protection region 106, and a thermal radiation protection region 108. The electrical charge protection region 106 may protect the aerospace structure 110 from at least one of electrostatic pulses and electromagnetic pulses (EMPs). In some embodiments, the protective assembly may optionally comprise two electrical charge protection regions 106. In such embodiment, a first electrical charge protection region 106a may provide protection against electrostatic pulses, and a second electrical charge protection region 106b may provide protection against EMPs.

Figure 3:
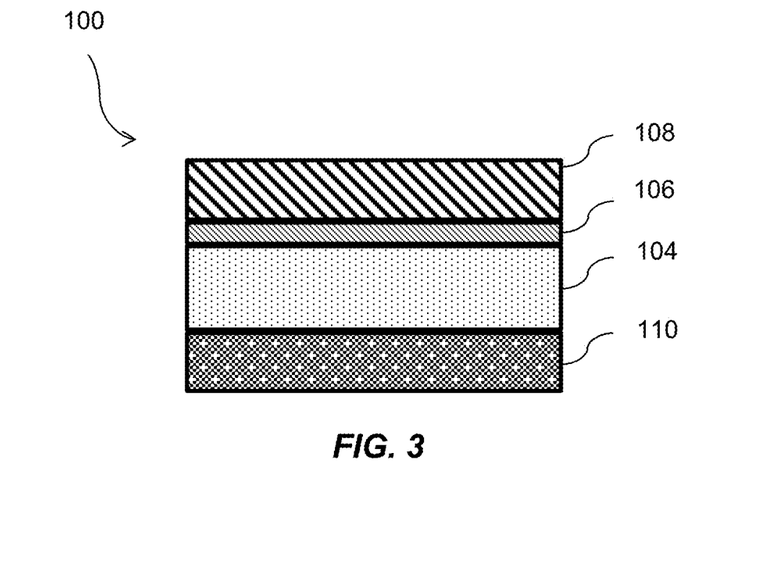
FIG. 3 is a schematic cross-sectional view of a protective assembly disposed on an aerospace structure according to some embodiments of the disclosure.

In further embodiments, the protective assembly 100 may include only those regions that protect against threats with which the aerospace structure 110 is anticipated to encounter. Accordingly, if it is not anticipated that the aerospace structure 110 will encounter a particular threat, protection against this particular threat may not be provided so as to reduce weight and cost of the aircraft or spacecraft. For example, as illustrated in FIG. 3, the protective assembly 100 may lack the radiation protection region 102.

Figure 4:
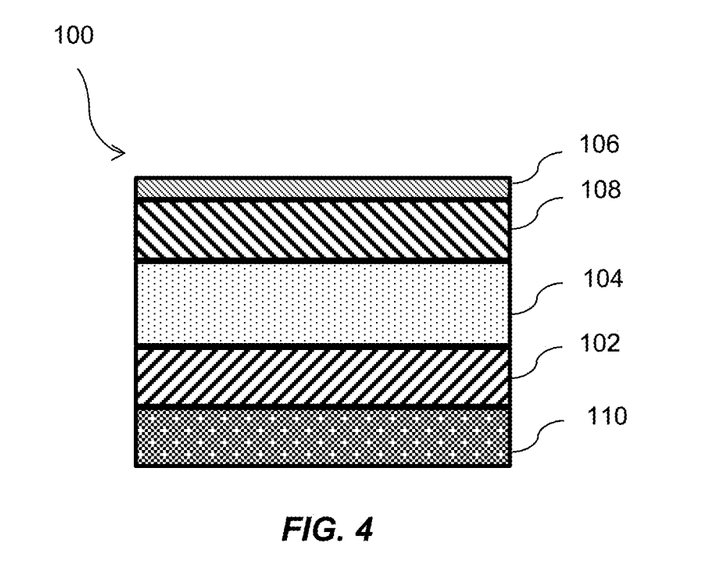
FIG. 4 is a schematic cross-sectional view of a protective assembly disposed on an aerospace structure according to embodiments of the disclosure.

Additionally, the regions of the protective assembly 100 may be provided in an order over the aerospace structure 110 depending on the order in which the aerospace structure 110 is expected to encounter one or more threats. Accordingly, the regions of the protective assembly 100 may be provided in an order different from that illustrated in FIGS. 1 and 2. For example, as illustrated in FIG. 1, the protective assembly 100 may comprise from inboard to outboard, the radiation protection region 102, the second electrical charge protection region 106b, the ballistic protection region 104, the first electrical charge protection region 106a, and the thermal radiation protection region 108. In other embodiments, as illustrated in FIG. 3, the protective assembly 100 includes from inboard to outboard the ballistic protection region 104, the electrical charge protection region 106, and the thermal radiation protection region 108 from inboard to outboard. In FIG. 4, the protective assembly 100 includes from inboard to outboard the ballistic protection region 104, the thermal radiation protection region 108, and the electrical charge protection region 106.

In some embodiments, one or more of the various regions may be provided with multiple layers or sheets of material. In some embodiments, one or more of the various regions may be provided in a same region or volume of material.

The radiation protection region 102 may be configured to protect the aerospace structure 110 from radiation due to radioactivity and/or electromagnetic radiation. For example, the radiation protection region 102 may be configured to protect the underlying aerospace structure 110 from one or more of X-ray radiation, gamma radiation, alpha radiation, and beta radiation. The radiation protection region 102 may comprise a particle-matrix composite material including a matrix 112 having a plurality of particles 114 dispersed therein (FIG. 6). As used herein, the term "particles" may mean and include any coherent volume of solid matter having an average dimension of 1 mm or less. In some embodiments, the particles 114 may comprise microparticles, or particles having an average particle diameter of about 10 μm or less. In other embodiments, the particles 114 may comprise nanoparticles, or particles having an average particle diameter about 100 nm or less. In yet other embodiments, the particles 114 may comprise a mixture of microparticles and nanoparticles.

The particles 114 may comprise a metal or metal alloy and, more particularly, a metal having a high atomic number (e.g., a high Z metal) or an alloy comprising such a metal. The metal or metal alloy of the particles 114 may be selected based on the efficiency of the metal or metal alloy to at least partially (e.g., substantially entirely, entirely) prevent radiation from passing through the radiation protection region 102 as the particles 114 reflect radiation to which the aerospace structure 110 and assembly 100 may be exposed. In some embodiments, the particles 114 may comprise a metal or metal alloy having an atomic number greater than or equal to 26. By way of non-limiting example, the particles 114 may comprise at least one of iron (Z=26), tantalum (Z=73), tungsten (Z=74), bismuth (Z=83), or uranium (Z=92). The radiation protection region 102 may comprise up to about 80 weight percent (wt %), up to 85 wt %, up to 90 wt %.

The matrix 112 of the radiation protection region 102 may comprise a polymeric material such that the radiation protection region 102 comprises a particle-polymer composite. In some embodiments, the polymeric material may be an elastomeric material. The polymeric material may be selected to comprise an ethylene acrylic elastomer (AEM), such as VAMAC®, rubber, such as a silicone rubber or an ethylene propylene diene monomer (EPDM) rubber, or a styrene block-based thermoplastic elastomer.

The ballistic protection region 104 may be configured to protect the aerospace structure 110 from impact with foreign objects during use of the structure. For example, the ballistic protection region 104 may be configured to protect the aerospace structure 110 from hail, rocks, dirt, micro-meteoroids, and other debris that may exist inside and outside of Earth's atmosphere as well as erosion from dust and/or rain. The ballistic protection region 104 may comprise a composite material including fibers 116 embedded with or within a matrix 118. The fibers 116 may comprise aramid fibers, such as para-aramid synthetic fibers (e.g., KEVLAR®), carbon fibers, and/or boron fibers.

In some embodiments, the fibers 116 may form a dispersed phase within the matrix 118, which may form a substantially continuous matrix phase. The fibers 116 may be formed of at least one of plies of fibers (e.g., woven fiber fabric) or unidirectional fiber windings. In some embodiments, the fibers 116 may be oriented within the matrix 118 to protect the aerospace structure 110 from impact with foreign objects traveling in an anticipation direction of impact with the assembly 100 and the aerospace structure 110. In such embodiments, a portion of the fibers 116 may be oriented in a direction substantially parallel with the anticipated direction of impact. Another portion of the fibers 116 may be oriented in a direction substantially perpendicular with the anticipated direction of impact in order to prevent displacement of the fibers 116 oriented parallel to the anticipated direction of impact. Such selective orientation of the fibers 116 within the matrix 118 enables the amount of fibers 116 included within the ballistic protection region 104 to effectively protect the aerospace structure 110 can be reduced by, for example, eliminating randomly oriented fibers and, as a result, the weight of the ballistic protection region 104 and the protective assembly 100 as a whole may be reduced.

Figure 7:
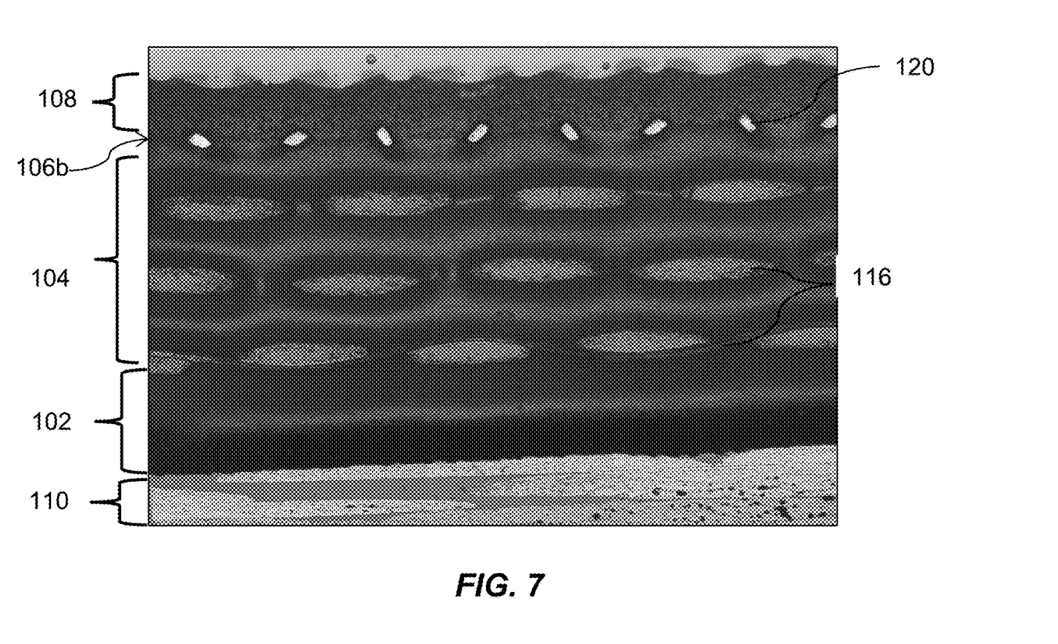
FIG. 7 is a cross-sectional micrograph of a protective assembly co-cured on an aerospace structure according to embodiments of the disclosure.

In some embodiments, the ballistic protection region 104 comprises a plurality of layers of fibers embedded with or within the matrix 118, such as a plurality of embedded fabric layers, as illustrated in FIGS. 6 and 7. The number of fiber layers may be selected depending on the impact resistance necessary during use of the aerospace structure 110. The composite of fibers 116 and matrix 118 may have a sufficient impact resistance to resist (e.g., inhibit, prevent) penetration by and absorb energy from any projectile that may impact the aerospace structure 110 and the assembly 100. In some embodiments, the ballistic protection region 104 may further comprise fiber pulp to provide the underlying aerospace structure 110 with additional ballistic and thermal protection. The ballistic protection region 104 may comprise up to about 20 parts per hundred of the fiber pulp in the matrix 118.

The matrix 118 may comprise a polymeric material. Accordingly, the ballistic protection region 104 may comprise a fiber-reinforced polymer material. The polymeric material may comprise an elastomeric material. In some embodiments, the matrix 118 may comprise an ethylene acrylic elastomer, such as VAMAC®, rubber, such as a silicone rubber or an ethylene propylene diene monomer (EPDM) rubber, or a styrene block-based thermoplastic elastomer.

The electrical charge protection region 106 may be configured to protect the aerospace structure 110 from at least one of electrostatic discharge (e.g., electrostatic pulses) and electromagnetic discharge (e.g., electromagnetic discharge). The electrical charge protection region 106 may comprise a metallic material 120 of a metal or metal alloy. The metal or metal alloy may be highly electrically conductive and/or may have high magnetic permeability. In some embodiments, the metallic material 120 may be porous and may comprise a metallic mesh. In such embodiments, the electrical charge protection region 106 may further comprise a matrix 107 (FIG. 6) that permeates pores (e.g., openings) within the mesh of the metallic material 120. The matrix 107 may comprise a polymeric material such as an elastomeric material. The elastomeric material may be selected to comprise an ethylene acrylic elastomer, such as such as VAMAC®, rubber, such as a silicone rubber or an ethylene propylene diene monomer (EPDM) rubber, or a styrene block-based thermoplastic elastomer.

In other embodiments, the metallic material 120 may be non-porous and may comprise a metallic foil. In operation, the mesh or foil of the metallic material 120 may dissipate the pulses of energy through the conductive pathways thereof to and at least partially prevent the energy from passing to the underlying aerospace structure 110. In some embodiments, the mesh or foil 120 may comprise silver, copper, aluminum, nickel, and iron, as well as alloys of and combinations of the foregoing.

In some embodiments, separate electrical charge protection regions may be provided that provide protect the aerospace structure 110 from electrostatic pulses and electromagnetic pulses, respectively. As illustrated in FIG. 1, in such embodiments, the protective assembly 100 may comprise the first electrical charge protection region 106a providing protection against electrostatic pulses and the second electrical charge protection region 106b providing protection against EMPs. The first and second electrical charge protection regions 106a, 106b are illustrated in FIG. 1 having a dashed outline to indicate that one or both of the first and second electrical charge protection regions 106a, 106b may be optionally provided. The electrical charge protection region 106a may comprise a mesh of a highly conductive metal or metal alloy. The mesh of the electrical charge protection region 106a may comprise copper, aluminum, and silver, as well as alloys and combinations of the foregoing. The electrical charge protection region 106b may comprise a foil of a highly conductive material and a foil of a material exhibiting high magnetic permeability. In such embodiments, the electrical charge protection region 106b may comprise at least one foil of copper, aluminum, and silver, as well as alloys and combinations thereof and at least one foil of iron and nickel, as well as alloys and combinations thereof.

Such foils may be coupled (e.g., laminated) together to form the electrical charge protection region 106b according to ASTM Standard D2651 (Standard Guide for Preparation of Metal Surfaces for Adhesive Bonding). The foils may be coupled (e.g., adhesively bonded) to each other and to an adjacent region of the protective assembly 100 by an adhesive 122. The adhesive 122 may comprise a polymeric material. In some embodiments, the adhesive 122 may be selected to comprise at least one of an epoxy, a bi-maleimide (BMI) resin, and an ethylene acrylic elastomer, such as VAMAC®, rubber, such as a silicone rubber or an ethylene propylene diene monomer (EPDM) rubber, or a styrene block-based thermoplastic elastomer.

The thermal radiation protection region 108 may be configured to protect the aerospace structure 110 against thermal radiation. In some embodiments, the thermal radiation protection region 108 may further be configured to protect the aerospace structure 110 against rain ablation. The thermal radiation protection region 108 may comprise a composite material including a matrix 124 and a dispersed phase. In some embodiments, the matrix 124 (FIG. 6) of the composite material may comprise a polymeric material such as an elastomeric material. The elastomeric material may comprise an ethylene acrylic elastomer, such as VAMAC®, rubber, such as a silicone rubber or an ethylene propylene diene monomer (EPDM) rubber, or a styrene block-based thermoplastic elastomer.

In some embodiments, the dispersed phase may comprise particles 126 (FIG. 6) dispersed in the matrix 124. The particles 126 may be white in appearance and may provide the thermal radiation protection region 108 generally with a white coloring. In some embodiments, the particles 126 may comprise boron nitride or titanium dioxide. Alternatively or additionally, the thermal radiation protection region 108 may comprise a dispersed phase of fibers other particles, fibers, and the like to lower the thermal diffusivity of the thermal radiation protection region 108. In such embodiments, the dispersed phase of the thermal radiation protection region 108 may comprise one or more of para-aramid synthetic fibers (e.g., KEVLAR®), para-aramid fiber pulp, para-aramid fiber rovings, and hollow, ceramic microspheres.

While each region of the assembly 100 has been described with regard to a primary or individual protective function, the assembly 100 as a whole may be configured to protect the aerospace structure 110 against thermal damage. The aerospace structure 110 may be subject to heat produced from thermal radiation, from the high-speed passage of the aerospace structure 110 through air, and the like. In some embodiments, the assembly 100 may be configured as a thermal insulator and may reduce the amount of heat transferred to the aerospace structure 110. For instance, inclusion of a dispersed phase comprising, for example, para-aramid fibers, para-aramid pulp, and/or ceramic microspheres as previously described herein to one or more of the regions of the assembly 100 may reduce the thermal conductivity and/or may increase ablation resistance of one or more regions of the assembly 100. The thermal conductivity and density of one or more regions of the assembly 100 may be reduced by introducing blow agents, foaming agents, accelerators, or other mechanisms to provide gas pockets in the polymeric matrix and form a foam matrix. The foam may include open cells and/or closed cells. In some embodiments, the foam may have up to about 50% porosity.

Furthermore, the matrix of two or more (e.g., each) regions of the assembly 100 may comprise a common (e.g., substantially the same) polymeric material. For example, the matrix of two or more of the regions (e.g., adjacent regions) of the assembly 100 may be similar in composition (e.g., 80% similar in composition, 90%, 95%, 100%). In some embodiments, a majority of (e.g., an entirety of) the matrix of two or more of the regions of the assembly 100 may be similar in composition. In some embodiments, at least a portion of the matrix at a common boundary or interface between two or more adjacent regions of the assembly 100 may be similar in composition. For example, one or more of the matrices of the regions may gradually transition to a common material at the interface. By selecting each region or at least adjacent regions of the assembly 100 to comprise a common polymeric material, an interface between adjacent regions of the assembly 100 may be impedance matched and/or thermal expansion matched (e.g., having substantially the same coefficient of thermal expansion). In operation, interfaces that are impedance and thermally matched are less susceptible to separating (e.g., delaminating, failing) due to interactions with the environment in which the assembly 100 is exposed during use as compared to interfaces between dissimilar materials.

In some embodiments, the aerospace structure 110 over which the assembly 100 is applied may be formed of a composite material that includes a reinforcing phase (e.g., dispersed phase) disposed within a matrix. For example, the reinforcing phase may comprise particles, whiskers, fibers, etc. In some embodiments, the reinforcing phase may comprise a carbon fiber reinforcing phase or may include other reinforcing fibers, such as, for example, fiberglass, aramids, boron, ceramics, or combinations thereof. The matrix may comprise a polymeric material. The polymeric material may comprise an elastomeric polymer, such as a cyanate ester polymer matrix. In other embodiments, the aerospace structure 110 may comprise a metal or metal alloy.

Figure 5:
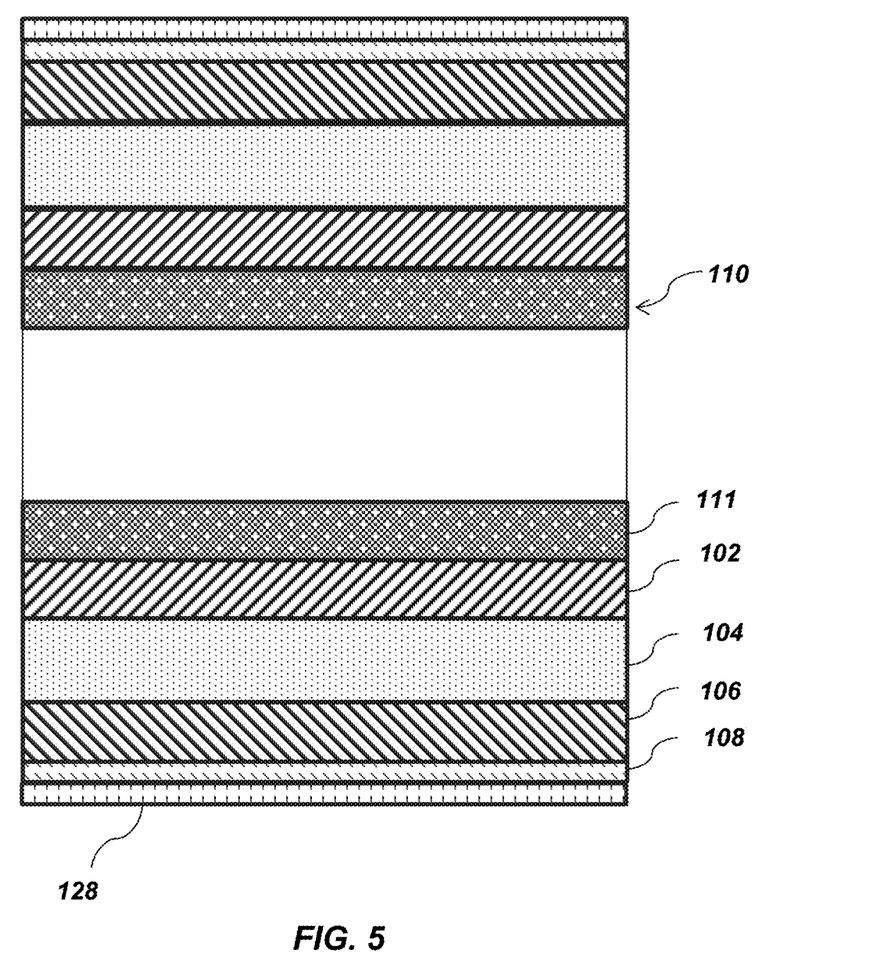
FIG. 5 is a schematic cross-sectional view of a protective assembly disposed on an aerospace structure during a co-curing process according to embodiments of the disclosure.

Embodiments of the disclosure also relate to methods of forming the protective assembly 100 and, more particularly, to forming the protective assembly 100 on the aerospace structure 110. FIG. 5 illustrates a cross-sectional view of the protective assembly 100 enclosed about the aerospace structure 110. As illustrated in FIG. 4, the aerospace structure 110 is a cylindrical portion of an aerospace structure body 111. The assembly 100 may be formed by providing (e.g., overlying) each of the respective layers of each of the radiation protection region 102, the ballistic protection region 104, the electrical charge protection region 106, and the thermal radiation protection region 108 over the aerospace structure body 111 of the aerospace structure 110. At least a portion of one or more (e.g., all) of the foregoing regions of the assembly 100 is provided over the aerospac structure body 111 of the aerospace structure 110 in an at least partially uncured state (e.g., entirely uncured, partially uncured, a majority uncured). More particularly, the polymeric material of each of the foregoing regions of the protective assembly may be initially provided in an uncured state. The matrix of the aerospace structure 110 may also be provided in an at least partially uncured state. In some embodiments, the layers of one or more of the foregoing regions may be provided over the aerospace structure 110 by a wet lay-up process. In other embodiments, layers of one or more of the foregoing regions may be provided by a filament winding process or hand layup of pre-preg.

The assembly 100 may be bonded to the aerospace structure 110 by a co-curing process. As used herein, the term "co-curing" may mean and include a curing process in which two or more materials each in an at least partially uncured state (e.g., entirely uncured, partially uncured, a majority uncured) are joined and bonded together during the same process. In the co-curing process, the uncured regions of the protective assembly 100 may be joined together by simultaneously curing and bonding. Such curing and bonding may result in a chemical bond and/or a mechanical interlocking at the interface between the respective regions of the assembly 100. As previously described herein, the matrix of one or more regions of the assembly 100 is substantially the same polymeric material and, as a result of co-curing the common matrix, the interface between adjacent regions of the assembly 100 may be substantially indistinct (e.g., seamless) as illustrated in FIG. 7. Further, the matrix of the one or more regions may be continuous and chemically bonded (e.g., intermingled) at the interface. Unlike a co-bonding process, or a curing process in which two or more materials at least one of which is in a fully cured are joined and bonded together, or an adhesive bonding process, or a process in which two or more materials are joined together by a curing process of an adhesive therebetween, the co-curing process results in a chemical bond between the regions of the protective assembly 100 and between the protective assembly 100 and the aerospace structure 110. Accordingly, the regions of the protective assembly 100 have higher interfacial strength and are less susceptible to separating (e.g., delaminating, failing) due to interactions with the environment in which the assembly 100 is exposed during use compared to structures formed by co-bonding or adhesive bonding.

In some embodiment, the matrix of the regions of the protective assembly 100 may be co-cured with the aerospace structure 110, which may be provided in an at least partially uncured state. In other embodiments, the matrix of the regions of the protective assembly 100 may be co-cured and the protective assembly 100 may be co-bonded to the aerospace structure. In yet other embodiments, such as embodiments in which the aerospace structure 110 comprises a metal or metal alloy, the assembly 100 may be bonded to the aerospace structure 110 by an adhesive bonding or vulcanization process.

During the co-curing process, heat is applied to cure the polymeric material of one or more regions of the assembly 100 and to bond the regions together at their respective interfaces. In some embodiments, the aerospace structure 110 and the assembly 100 may be heated in an auto-clave or an oven for the co-curing process. In some embodiments, the auto-clave or oven may heat the aerospace structure 110 and the assembly 100 to a temperature of up to about 400° F.

In some embodiments, force (e.g., pressure) may be applied to the aerospace structure 110 and the assembly 100 during the co-curing process. As illustrated in FIG. 5, in such embodiments, the pressure may be provided by a film 128 provided about the exterior surface of the assembly 100. The film 128 may apply a compressive pressure to the aerospace structure 110 and the assembly 100 throughout the co-curing process while allowing gases produced during the co-curing that may cause pitting or other deformations of the aerospace structure 110 and/or assembly 100 to escape through the film 128. In some embodiments, the film 128 may comprise a fiberglass wrap, such as Armalon (a polytetrafluoroethylene coated fiberglass). In other embodiments, the film 128 may comprise a vacuum bag. In such embodiments, a vacuum may be drawn on the bag to remove air and other gases produced during the co-curing process from within the bag.

While the disclosed structures and methods are susceptible to various modifications and alternative forms in implementation thereof, specific embodiments have been shown by way of example in the drawings and have been described in detail herein. However, it should be understood that the disclosure is not limited to the particular forms disclosed. Rather, the present invention encompasses all modifications, combinations, equivalents, variations, and alternatives falling within the scope of the disclosure as defined by the following appended claims and their legal equivalents.

What is claimed is:

1. A protective assembly, comprising:
    a first region comprising a composite of particles and polymer, the first region formulated and configured to provide protection from alpha, beta, and electromagnetic radiation;
    a second region comprising a composite of fibers and polymer, the second region formulated and configured to provide protection from ballistic impact; and
    a third region comprising a composite of particles, fibers, and polymer, the third region formulated and configured to provide protection from thermal radiation;
    wherein each of the first region, the second region, and the third region comprises a common polymer.

2. The protective assembly of claim 1, further comprising an additional region comprising at least one of a metallic mesh or a metallic foil, wherein the additional region is formulated and configured to provide protection from at least one of electrostatic discharge and electromagnetic discharge.

3. The protective assembly of claim 2, wherein the at least one of the metallic mesh or the metallic foil comprises at least one of silver, copper, aluminum, nickel, and iron.

4. The protective assembly of claim 2, wherein the additional region comprises the metallic mesh and a polymer, the polymer of the additional region comprising the common polymer of the first region, the second region, and the third region.

5. The protective assembly of claim 2, wherein the common polymer is continuous at a bond interface between adjacent regions of the first region, the second region, the third region, and the additional region to form a substantially indistinct interface therebetween.

6. The protective assembly of claim 2, wherein a bond interface between adjacent regions of the first region, the second region, the third region, and the additional region comprises a chemical bond interface.

7. The protective assembly of claim 2, wherein the first region, the additional region, the second region, and the third region are provided sequentially over an outer surface of an aerospace structure, the first region comprising an innermost region of the protective assembly and the third region comprising an outermost region of the protective assembly.

8. The protective assembly of claim 1, wherein the common polymer comprises an ethylene acrylic elastomer.

9. The protective assembly of claim 8, wherein at least one of the first region, the second region, and the third region comprises an ethylene acrylic elastomer foam.

10. The protective assembly of claim 1, wherein the fibers of the second region and the third region comprise aramid fibers.

11. The protective assembly of claim 1, wherein the particles of the first region comprise particles of a high-Z metal.

12. A protective assembly, comprising:
    a first region comprising a composite of reinforcing material in a matrix material, the first region formulated and configured to provide protection from alpha, beta, and electromagnetic radiation;
    a second region comprising a composite of reinforcing material in a matrix material, the second region formulated and configured to provide protection from ballistic impact; and
    a third region comprising a composite of particles and fiber in a matrix material, the third region formulated and configured to provide protection from thermal radiation;
    wherein the matrix material of at least two of the first region, the second region, or the third region comprises a substantially similar material.

13. The protective assembly of claim 12, wherein the matrix material of the at least two of the first region, the second region, and the third region comprises a substantially continuous material at an interface between the at least two of the first region, the second region, and the third region.

14. An aerospace structure comprising:
    an aerospace structure body; and
    a protective assembly formed on an exterior surface of the aerospace structure body, the protective assembly comprising:
        a first region comprising a composite of particles and polymer, the first region formulated and configured to provide protection from alpha, beta, and electromagnetic radiation;
        a second region comprising a composite of fibers and polymer, the second region formulated and configured to provide protection from ballistic impact; and
        a third region comprising a composite of particles, fiber, and polymer, the third region formulated and configured to provide protection from thermal radiation;
        wherein at least two of the first region, the second region, or the third region comprises a common polymer.

15. The aerospace structure of claim 14, wherein the protective assembly is co-cured such that a chemical bond exists at an interface between adjacent regions of the first region, the second region, and the third region.

16. The aerospace structure of claim 14, wherein the aerospace structure body comprises a fiber-reinforced composite body.

17. The aerospace structure of claim 16, wherein the protective assembly is co-cured to the aerospace structure such that a chemical bond exists at an interface between the aerospace structure body and the protective assembly.

18. A method of forming a protective assembly for an aerospace structure, comprising:
    mounting a protective assembly over an aerospace structure body, the protective assembly comprising:
        a first region comprising a composite of particles and polymer, the first region formulated and configured to provide protection from alpha, beta, and electromagnetic radiation;
        a second region comprising a composite of fibers and polymer, the second region formulated and configured to provide protection from ballistic impact; and
        a third region comprising a composite of particles, fiber, and polymer, the third region formulated and configured to provide protection from thermal radiation;
    wherein the first region, the second region, and the third region are each provided in an at least partially uncured state; and co-curing the protective assembly to form a chemical bond between adjacent regions of the first region, the second region, and the third region and to attach the protective assembly to the aerospace structure body.

19. The method of claim 18, further comprising positioning a fourth region comprising a metallic mesh and polymer over the aerospace structure body, the fourth region formulated and configured to provide protection from electrostatic pulses.

20. The method of claim 19, wherein mounting the protective assembly over the aerospace structure body comprises mounting at least one of the first region, the second region, the third region, and the fourth region to an at least partially uncured fiber-reinforced composite structure using a hand lay-up process.

21. The method of claim 18, further comprising applying a compressive force on the protective assembly toward the aerospace structure body while co-curing the protective assembly.

22. The method of claim 18, further comprising selecting the polymer of each of the first region, the second region, and the third region to comprise an ethylene acrylic elastomer.

\* \* \* \* \*

UNITED STATES PATENT AND TRADEMARK OFFICE
CERTIFICATE OF CORRECTION

PATENT NO.        : 11,077,627 B2
APPLICATION NO.   : 16/103428
DATED             : August 3, 2021
INVENTOR(S)       : Steven F. Stone et al.

Page 1 of 1

It is certified that error appears in the above-identified patent and that said Letters Patent is hereby corrected as shown below:

In the Specification
Column 9,   Line 52,   change "aerospac" to --aerospace--

Signed and Sealed this
Seventh Day of September, 2021

Drew Hirshfeld
*Performing the Functions and Duties of the
Under Secretary of Commerce for Intellectual Property and
Director of the United States Patent and Trademark Office*